(12) United States Patent
Linemann et al.

(10) Patent No.: US 9,593,191 B2
(45) Date of Patent: Mar. 14, 2017

(54) USE OF 2-OCTYL ACRYLATE POLYMER AS A BINDING AGENT IN A COATING COMPOSITION

(71) Applicant: Arkema France, Colombes (FR)

(72) Inventors: Reinhard Linemann, Saarbrucken (DE); Isabelle Betremieux, Coye la Foret (FR); Jean-Yves Loze, Pontpoint (FR); Alain Boone, Verderonne (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 14/899,186

(22) PCT Filed: Jun. 26, 2014

(86) PCT No.: PCT/FR2014/051615
§ 371 (c)(1),
(2) Date: Dec. 17, 2015

(87) PCT Pub. No.: WO2014/207389
PCT Pub. Date: Dec. 31, 2014

(65) Prior Publication Data
US 2016/0152751 A1  Jun. 2, 2016

(30) Foreign Application Priority Data
Jun. 28, 2013  (FR) ..................... 13 56312

(51) Int. Cl.
C08F 220/18 (2006.01)
C04B 26/06 (2006.01)
C04B 28/26 (2006.01)
C09D 11/106 (2014.01)
C09D 11/107 (2014.01)
C09D 133/08 (2006.01)
C09D 133/10 (2006.01)
C04B 111/00 (2006.01)

(52) U.S. Cl.
CPC ............ *C08F 220/18* (2013.01); *C04B 26/06* (2013.01); *C04B 28/26* (2013.01); *C09D 11/106* (2013.01); *C09D 11/107* (2013.01); *C09D 133/08* (2013.01); *C09D 133/10* (2013.01); *C04B 2111/00482* (2013.01); *C08F 2220/1858* (2013.01)

(58) Field of Classification Search
CPC ................... C04B 26/06; C04B 28/26; C04B 2111/00482; C09D 11/10; C09D 133/02; C09D 133/08; C09D 133/12; C09D 11/106; C09D 11/107; C09D 133/10; C08F 220/18; C08F 2220/1858
USPC ........................................................ 524/561
See application file for complete search history.

(56) References Cited

U.S. PATENT DOCUMENTS

| | | | |
|---|---|---|---|
| 4,983,454 A * | 1/1991 | Hiraki | ..................... B05D 7/56 204/486 |
| 5,011,733 A | 4/1991 | Hiraki et al. | |
| 5,439,970 A | 8/1995 | Reeb | |
| 7,385,020 B2 | 6/2008 | Anderson et al. | |
| 7,893,179 B2 | 2/2011 | Anderson et al. | |
| 8,318,303 B2 | 11/2012 | Lu et al. | |
| 8,816,008 B2 | 8/2014 | Pirri et al. | |
| 2009/0270003 A1 | 10/2009 | Anderson et al. | |
| 2010/0151251 A1 | 6/2010 | Molta et al. | |
| 2011/0054115 A1* | 3/2011 | Erdogan | ................ C09J 133/08 524/556 |
| 2012/0121921 A1 | 5/2012 | Cosyns et al. | |
| 2012/0329898 A1 | 12/2012 | Weikel et al. | |
| 2014/0065435 A1 | 3/2014 | Overbeek | |

OTHER PUBLICATIONS

Aldrich Polymer Products—Thermal Transitions of Homopolymers: Glass Transition & Melting Point https://www3.nd.edu/~hgao/thermal_transitions_of_homopolymers.pdf.*
Mattioni et al., "Prediction of Glass Transition Temperatures from Monomer and Repeat Unit Structure Using Computational Neural Networks", J. Chem. Inf. Comput. Sci., 2002, 42, 232-240.*

* cited by examiner

*Primary Examiner* — Ling Choi
*Assistant Examiner* — Ronald Grinsted
(74) *Attorney, Agent, or Firm* — Lynn B. Morreale

(57) ABSTRACT

The present invention relates to the use of a polymer from the polymerization of 2-octyl acrylate of renewable origin and optionally at least one other monomer, as a binding agent in or for the production of a coating composition.

7 Claims, No Drawings

USE OF 2-OCTYL ACRYLATE POLYMER AS A BINDING AGENT IN A COATING COMPOSITION

CROSS-REFERENCE TO RELATED APPLICATIONS

This application is a national stage application under 35 U.S.C. §371 of PCT/FR2014/051615, filed Jun. 26, 2014, which claims benefit to French patent application FR 13.56312, filed Jun. 28, 2013.

TECHNICAL FIELD

The present invention relates to the use of a polymer resulting from the polymerization of 2-octyl acrylate and optionally at least, one other monomer as binding agent in or for the manufacture of a coating composition.

BACKGROUND OF THE INVENTION

It is known to apply paints of acrylic type to surfaces, in particular building façades, not only to embellish them and to prevent the deposition of dirt, in particular dust, but also in order to protect them against the infiltration of rainwater. To this end, the coating must be able to adhere suitably to the surface, deform easily without risk of cracking and not exhibit a tacky nature.

An example of a paint composition exhibiting the above-mentioned compromise in properties has been disclosed in the application EP 0 599 676. This composition includes a polymer resulting from the polymerization of three distinct monomers, consisting in particular of a mixture of (meth)acrylic acid, a (meth)acrylic acid ester, such as n-butyl acrylate, and a benzophenone derivative, and optionally of a fourth monomer which is styrene.

Another type of paint composition has been described in the document US 2012/0121921. It is a flame-retardant and water-resistant polymer composition, comprising a polymer binder in the latex form, obtained by radical polymerization of at least one ethylenically unsaturated monomer, comprising in particular n-butyl acrylate, and of tert-butyl(meth)acrylate.

Acrylic compounds, optionally in combination with styrene, in addition exhibit the advantage of making possible the formulation of paints giving good resistance to light and to weather conditions. However, they are generally produced from propylene, which is a byproduct of the refining of oil. In point of fact, oil deposits are rapidly becoming exhausted. In order to anticipate the supplying difficulties relating to these resources, it would be desirable to be able to replace these acrylic compounds with compounds obtained from carbon sources of renewable origin.

In order to meet this need, provision has been made, in the application WO 2012/084974, to use, as binder in paints, a dispersion of two vinyl polymers including at least 10% by weight of monomers of renewable origin, such as n-butyl acrylate. It is indicated that this binder makes it possible to obtain a flexible and nontacky paint which dries at low temperature.

However, it is apparent to the applicant company that n-butyl acrylate does not include sufficient, carbon of renewable origin and that it exhibits a more hydrophilic nature than long-chain acrylates, such as 2-octyl acrylate.

After numerous research studies, the applicant company has demonstrated that it is possible to formulate a composition for coating in the film form, based on polymer of predominantly renewable origin, which composition simultaneously exhibits good mechanical properties, in particular a suitable flexibility and a suitable elongation and a good cohesion, and also a sufficiently hydrophobic nature, using, as binder, a homo- or copolymer based on 2-octyl acrylate.

Such a compound has already been described, in particular, in the application WO 2012/038441, as constituent of an impact modifier, and in the documents WO 2008/046000, WO 2009/079582, WO 2009/132098 and WO 2003/129087, as constituent of a pressure-sensitive adhesive.

In the document U.S. Pat. No. 4,983,454, an acrylic resin based on 2-octyl acrylate and other (meth)acrylic monomers, prepared in an aqueous solvent, is used as barrier-forming coating interposed between, on the one hand, a metal substrate covered with a layer of paint obtained by electrode position and, on the other hand, an upper layer of paint. The acrylic resin exhibits a glass transition temperature of $-52°$ C. and an elongation at break at $-20°$ C. of 610%. This coating is presented as flexible, adhesive and in particular capable of absorbing energy in order to protect the composite material against impacts, this composite material advantageously constituting a motor vehicle paint.

The applicant company has now discovered that it is possible to use 2-octyl acrylate of renewable origin to prepare a copolymer exhibiting specific properties well suited to forming a binder in coating compositions, this coating having properties identical with those obtained with monomers resulting from the petrochemical industry.

ACCOUNT OF THE INVENTION

A subject, matter of the present invention is thus the use of a polymer resulting from the polymerization of 2-octyl acrylate of renewable origin and optionally at least one other monomer, as binding agent in or for the manufacture of a coating composition.

DETAILED DESCRIPTION OF EMBODIMENTS

In this invention, provision is made to use a specific polymer as binding agent in a coating composition.

The term "coating" is understood to mean, in the present description, a layer applied to a substrate in the film form, with a thickness generally of between 50 μm and a few mm, starting from a binding polymer with a Tg of between $-40°$ C. and $+40°$ C. according to Fox's law, said film being applied in a thickness sufficient to modify the appearance of the substrate, in particular its optical properties, and/or to protect its surface, in particular against scratches, moisture, dirt or light.

The term "coating composition" thus does not encompass the adhesive compositions intended to improve the adhesive properties of the substrate. On the other hand, it encompasses paint, mortar, coating, varnish and ink compositions, without this list being limiting.

In addition, in this description, the expression "of between" is understood as including the limits cited and also all the intermediate values, and the expression "ranging from . . . to . . . " is understood as excluding the limits cited.

The polymer used according to the invention comprises 2-octyl acrylate of renewable origin.

This monomer results predominantly, indeed even completely, from plant sources and can thus be regarded as a material of renewable origin, which is characterized by the fact that its content of $^{14}C$ represents at least 50%, preferably at least 60%, for example at least 70%, indeed even at least 80%, of that of atmospheric $CO_2$ (according to the standard ASTM D6866). In other words, the 2-octyl acrylate comprises at least $0.6 \times 10^{-10}\%$ by weight of $^{14}C$, with respect to the total carbon, according to the standard ASTM D6866-06. The content of $^{14}C$ can be measured according to a method of counting by liquid scintillation and expressed in disintegrations per minute per gram of carbon, or dpm/gC. The dpm/gC value of the 2-octyl acrylate is generally at least 7.2±0.1 dpm/gC.

The 2-octyl acrylate can be prepared from 2-octanol and acrylic acid, in particular in the presence of an esterification catalyst of acid type comprising sulfur, such as methanesulfonic acid, and of at least one polymerization inhibitor. Alternatively, it can be prepared by a transesterification reaction between a light acrylate, such as ethyl acrylate, and 2-octanol. The 2-octanol can itself result from the treatment of ricinoleic acid, derived from castor oil, with sodium hydroxide, followed by a distillation in order to remove the sebacic acid. A process for the preparation of 2-octyl acrylate by direct esterification is in particular described in the application WO 2013/064775.

The abovementioned monomer can be homopolymerized, in which case the polymer used according to the invention is a 2-octyl acrylate homopolymer. In an alternative form, it can be copolymerized with at least one other monomer, so that the polymer used according to the invention is a copolymer including, advantageously, from 1% to 80% by weight, preferably from 25% to 75% by weight, more preferably from 30% to 75% by weight, indeed even from 50% to 70% by weight, of 2-octyl acrylate, with respect to the total weight of the copolymer.

Furthermore, the use of monomers, themselves at least partially of plant and/or animal origin, makes it possible to reinforce the biobased nature of the copolymer containing the 2-octyl acrylate.

This other monomer can in particular be chosen from: vinylaromatic monomers, such as styrene; ethylenically unsaturated nitriles, such as acrylonitrile; esters of ethylenically unsaturated mono- and dicarboxylic acids, such as 2-ethylhexyl acrylate, n-butyl acrylate, methyl methacrylate and itaconic acid esters; esters of monocarboxylic acid and vinyl or allyl alcohol, such as vinyl acetate; ethylenically unsaturated mono- and dicarboxylic and sulfonic acids, such as (meth)acrylic acid, itaconic acid and styrenesulfonic acids; amides of ethylenically unsaturated mono- and dicarboxylic acids, such as acrylamide; N-vinyllactams, such as N-vinyl-pyrrolidone; N-vinylamides; N,N-diallylamines; N,N-diallyl-N-alkylamines; allyl- or vinyl-substituted nitrogenous heterocycles, such as N-vinylimidazole and vinyl- and allylpyridines; and their mixtures. Preferred, comonomers are the esters of ethylenically unsaturated mono- and dicarboxylic acids, in particular methyl methacrylate and n-butyl acrylate, vinylaromatic monomers, more particularly styrene, and their mixtures.

Other functional or crosslinking monomers can advantageously be added to the 2-octyl acrylate before polymerization, for the purpose of improving the properties of chemical resistance to water or to different household products of the coating composition. These monomers can also improve the barrier properties or properties of resistance to the fouling of the coating composition, or also improve the mechanical properties of the polymer, such as its resistance to elongation. Mention may nonexhaustively be made, among the crosslinking monomers, of diacetone acrylamide in combination with the adipic acid bishydrazide, hydroxylated monomers in combination with polyisocyanates, siloxane-comprising (meth)acrylates, polyfunctional (meth)acrylates, that is to say (meth)acrylates exhibiting several unsaturations, and their mixtures. Mention may nonexhaustively be made, among the functional monomers, of acetoxyethyl (meth)acrylates, monomers carrying phosphate or phosphonate functional group(s), monomers carrying ureido functional group(s), monomers carrying amine functional group(s), and their mixtures.

The monomers constituting the polymer used according to the invention can be polymerized conventionally, for example by means of a radical aqueous emulsion polymerization. The pH of the emulsion can be buffered in order to be maintained between 4 and 7 during the polymerization process. The choice may be made, as radical initiators, of those conventionally used in this type of reaction and in particular inorganic initiators, such as ammonium persulfate, sodium persulfate and potassium persulfate, alone or in combination with a reducing agent intended to lower the polymerization temperature, or also organic initiators, such as tert-butyl hydroperoxide or hydrogen hydroperoxide, which are activated by reducing agents. Depending on the properties targeted, one or more chain-transfer agent(s) can be added during the process in order to obtain the desired distribution of molecular weights. The polymerization can be carried out at a temperature of 0° C. to 150° C., preferably of 30° C. to 100° C. and for example of 50° C. to 90° C., for a period of time of 4 to 6 hours, for example. It can be carried out at atmospheric pressure and/or in the presence of an inert gas. This polymerisation process results in a latex advantageously having a dry matter content of between 20% and 70% by weight, and preferably between 35% and 60% by weight.

The polymer obtained generally has a glass transition temperature (Tg), calculated by virtue of Fox's law, of between −40° C. and +40° C., preferably ranging from −30° C. to +30° C., more preferably of between −10° C. and 10° C., indeed even between −10° C. and 0° C.

The polymer can be obtained according to a single-stage process, that is to say with continuous feeding with a single monomelic composition, or according to a multi-stage process employing different monomeric compositions, in order to obtain particles exhibiting different Tg ranges. Particles of this type are denoted by particles of the core-shell type or structured particles. In this case, the mean Tg of the polymers obtained on conclusion of each stage can also be of between −40° C. and +40° C. and preferably ranging from −30° C. to +30° C.

In addition to this polymer, the coating composition used according to the invention contains water. It can include various additives chosen, for example, from: one or more pigments; one or more pulverulent fillers; one or more pH adjusters, in particular one or more bases making it possible to neutralize the acid monomers optionally copolymerised with the 2-octyl acrylate, such as an alkali metal hydroxide (in particular sodium, hydroxide), aqueous ammonia or a water-soluble amine; one or more dispersing and/or wetting agents, such as sodium polyphosphate, potassium polyphosphate or ammonium polyphosphate and naphthalenesulfonic acid salts; one or more thickening agents, such as xanthan and cellulose derivatives; one or more antifoaming agents; one or more film-forming agents; one or more antifreezes; one or more flame retardants, in particular organophosphorous compounds, magnesium hydroxide or aluminum hydroxide; one or more biocides; and their mixtures.

The pigments can in particular be chosen from: white or colored inorganic pigments, such as titanium dioxide, zinc oxide, barium sulfate, antimony trioxide, iron oxides, ultramarine and carbon black; organic pigments, such as azo dyes, indigo dyes and anthraquinone dyes; and their mixtures.

The pulverulent fillers can in particular be chosen from; calcium carbonate or magnesium carbonate; silica; silicates, such as talc, kaolin or mica; calcium sulfate; aluminosilicates; and their mixtures. These fillers are preferably employed in the finely divided form.

In addition, in particular in the case where it is used for the manufacture of a coating, the coating composition according to the invention can include an additional binder, in particular a silicon resin or a silicate.

The different constituents of the coating composition can be mixed in a way conventional for a person skilled in the art, in their normal proportions. It is preferable for the polymer to be added, generally in the form of an aqueous dispersion (latex), to a dispersion or a paste of pigments.

The polymer in the form of an aqueous dispersion generally represents from 5% to 90% by weight, preferably from 10% to 75% by weight, with respect to the total weight of the composition. By dry weight, the polymer generally represents from 5% to 50% by weight and preferably from 20% to 40% by weight, with respect, to the total weight of the composition.

This composition can be provided in the liquid or semi-solid form.

It preferably has a concentration of solids of between 25% and 75% by weight and preferably between 35% and 65% by weight.

The composition used according to the invention can be applied to any substrate, in particular made of wood, metal, glass, cement, paper, textile, leather, plastic or brick, by any means in particular using a brush, including a fine brush, a roller, a pad, a sprayer or an aerosol, optionally after application to the substrate of an adhesion primer.

It then forms, on this substrate, a film at ambient temperature (<30° C.), making it possible to confer on the substrate the desired esthetic properties and to protect the substrate, in particular against moisture.

A better understanding of the invention will be obtained in the light of the following nonlimiting examples, the aim of which is to illustrate the invention and not to limit the scope thereof, defined by the appended claims.

EXAMPLES

Example 1

Preparation of Polymer Dispersions

A. General Procedure
1) Starting Materials
Use was made, for the preparation of the polymers according to the invention, of the starting materials shown in table 1 below.

TABLE 1

| Constituent | Role | Chemical nature | Supplier |
| --- | --- | --- | --- |
| Emulsifier$^R$ E30 | Surfactant | Sodium alkanesulfonate | Rhodia |
| Disponil$^R$ FES77 | Surfactant | Sodium ethoxylated fatty alkyl sulfate (30% in water) | BASF |
| Disponil$^R$ A3065 | Surfactant | Mixture of ethoxylated linear fatty alcohols (65% in water) | BASF |
| Emulan$^R$ TO4070 | Surfactant | Ethoxylated fatty alcohol (70% in water) | BASF |
| 2EHA | Monomer | 2-Ethylhexyl acrylate | Arkema |
| 2OctA | Monomer | 2-Octyl acrylate | Arkema |
| BuA | Monomer | Butyl acrylate | Arkema |
| MMA | Monomer | Methyl methacrylate | Arkema |

TABLE 1-continued

| Constituent | Role | Chemical nature | Supplier |
| --- | --- | --- | --- |
| AA | Monomer | Acrylic acid | Arkema |
| MAA | Monomer | Methacrylic acid | Arkema |
| Acrylamide | Monomer | 2-Propenamide | Cytec |
| HPMA | Monomer | N-(2-Hydroxypropyl)-methacrylamide | BASF |
| HEMA | Monomer | Hydroxyethyl methacrylate | BASF |
| TEGDMa | Monomer | Triethylene glycol dimethacylate | BASF |
| AllylM | Crosslinking agent | Allyl methacrylate | BASF |
| nDDM | Mercaptan | N-Dodecyl mercaptan | Acros |
| $(NH_4)_2S_2O_8$ | Peroxide | Ammonium persulfate | Aldrich |
| $Na_2S_2O_5$ | Reducing agent | Sodium metabisulfite | Prolabo |
| NaOH | Neutralizing agent | Sodium hydroxide | Prolabo |
| Acticide MBS | Biocide | Methylisothiazoline (MIT) and Benzisothiazolinone (BIT) | Thor |

The Tg of the polymers was calculated as follows, according to Fox's law:

$$1/Tg = x^1/Tg^1 + x^2/Tg^2 + \ldots x^n/Tg^n$$

where x represents the fraction by weight of the monomer under consideration and Tg represents the glass transition temperature of its homopolymer. In the tests which follow, the values mentioned in table 2 below have been retained:

TABLE 2

| 2EHA | 2-Ethylhexyl acrylate | −70° C. |
| --- | --- | --- |
| BuA | Butyl acrylate | −54° C. |
| 2OctA | 2-Octyl acrylate | −49° C. |
| MMA | Methyl methacrylate | +105° C. |
| AA | Acrylic acid | +106° C. |
| MAA | Methacrylic acid | +228° C. |

2) Apparatus

The syntheses were carried out in a 3 l (internal capacity) glass reactor equipped with a jacket and provided with efficient, stirring (vortex), with a three-flow reflux condenser and with control and regulation of the material temperature. The reactor comprised the number of inlets necessary for the separate introduction of the different components and also an inlet dedicated to rendering the assembly inert with nitrogen. The leaktightness was confirmed before each synthesis. The apparatus was equipped with a system, which makes it possible to adjust the flow rates for the introduction of the components. The temperature of the material and also the temperatures of the jacket were recorded and adjusted. The synthesis was carried out semicontinuously.

3) Methods for Characterising the Dispersions a) Solids Content (SC)

The solids content of the aqueous dispersions was measured according to the ISO standard 3251.

b) pH

The pH of the aqueous dispersions was measured according to the ISO standard 976.

c) Viscosity

The viscosity of the aqueous dispersions was measured according to the ISO standard 2555.

d) Size of the Particles

The size of the particles was measured by Photon Correlation Spectroscopy (PCS) using an N4+ device from Beckman Coulter. The sample was diluted (3 to 5 drops of emulsion in 50 ml of water) in a polystyrene vessel using deionized water through a 0.22 μm cellulose acetate filter. The size of the particles was measured at a temperature of 25° C., under a measurement angle of 90° and at a wavelength of the laser of 633 nm.

e) Minimum Film-Formation Temperature (MFFT) Measured and Expected as a Function of the Structuring or Nonstructuring of the Particle The MFFT of the aqueous dispersions was measured according to the ISO standard 2115.

B. Syntheses Carried Out

A first polymer dispersion, hereinafter denoted "Dispersion D1", was prepared as follows.

15.25 g of a 40% solution of Emuisifier E30 were dissolved in 1165.85 g of demineralized water as vessel heel. The pH of the vessel heel was advantageously less than 3. The temperature of the vessel heel was brought to 80° C., Separately, a preemulsion was prepared by dispersing 44.38 g of Emulsifier E30 (40%) and 83.33 g of Disponil FES 77 (30%) in 865.04 g of demineralized water with good stirring.

The following were added thereto in turn and with good stirring:
 1007.5 g of MMA
 1462.5 g of 2OctA The preemulsion thus formed was white and stable during at least the time of the polymerization. It was kept under gentle stirring.

Finally, different solutions of catalysts were prepared as follows:
 S1: 1.25 g of ammonium persulfate were dissolved in 11.25 g of water.
 S2: 1.50 g of ammonium persulfate were dissolved in 148.50 g of water.
 S3: 1.25 g of ammonium persulfate were dissolved in 123.75 g of water.
 S4: 2 g of sodium metabisulfite were dissolved in 198 g of water.

The polymerization was carried out in the following way.

i) Seeding 270.1 g of the preemulsion described above were introduced, for the purpose of the seeding, into the vessel heel including the initial charge stable at 80° C. Once the temperature had stabilized at 80° C., 100% of the solution S1, of 12.5 g, were added. The exothermicity maximum marked the end of this stage.

The particle size was approximately 60 nm and the conversion was greater than 70%.

ii) Polymerization

The remainder of the preemulsion, and also 5 g of AllylM and 25 g of AA, were introduced over 210 minutes at a polymerization temperature of 82° C. The solution S2, i.e. 150 g, was run in parallel in 255 min.

iii) Stage of Consumption of the Residual Monomers

The temperature was maintained at 82° C. for 15 minutes. At the end of the thermal curing, the following were run in separately and in parallel:
 in 45 min, the solution S3, i.e. 125 g
 in 75 min, the solution S4, i.e. 200 g,
 still at 82° C. This redox treatment was followed by curing at 82° C. for 20 minutes before cooling to ambient temperature.

iv) Final Additions

The latex was neutralized at 30-35° C. by addition of sodium hydroxide solution up to pH 8-9 before adding a biocide thereto. It was subsequently adjusted in solids content and filtered through a 100 μm cloth. The final solids content amounted to 47.6%.

A dispersion D1 was obtained comprising a polymer based on MMA/2OctA/AA/AllylM in the proportions by weight of 40.3/58.5/1/0.2, exhibiting a Fox Tg of 0° C.

The final particle size was approximately 130 nm, the viscosity was less than 1000 mPa·s and the MFFT measured was 5° C.

The list of the other aqueous dispersions prepared on the basis of the same procedure is presented in table 3 below, with the compositions which vary from one test to another being indicated.

TABLE 3

| Monomers | Dispersion D2 (comparative) | Dispersion D3 (comparative) | Dispersion D4 |
|---|---|---|---|
| MMA | 41 | 46.05 | 36.45 |
| 2OctA | | | 60.6 |
| BuA | 56.05 | | |
| 2EHA | | 51 | |
| MAA | 2.7 | 2.7 | 2.7 |
| AA | 0.25 | 0.25 | 0.25 |
| MFFT (° C.) | 0 | +5 | +5 |
| Fox Tg (° C.) | −3 | −9 | −1 |

In these three tests, 68.5 g of methacrylic acid were added to the preemulsion and the AllylM was replaced with a transfer agent, nDDM, in a proportion of 0.025 part.

C. Physicochemical Characterization of the Dispersions

The characteristics of the dispersions D2 to D4 obtained are collated in table 4 below.

TABLE 4

| | D2 | D3 | D4 |
|---|---|---|---|
| Solids content (%) | 50.0 | 54.8 | 55.1 |
| pH after neutralization | 8 | 8 | 8.2 |
| Viscosity at 20 revolutions/min (mPa · s) | 120 | 1630 | 1750 |
| Temperature (° C.) | 20 | 21 | 20 |
| Rotor | 1 | 2 | 3 |
| Size of the particles (nm) | 145 | 160 | 160 |
| PI | 0.05 | 0.001 | 0.007 |
| MFFT (° C.) | 0 | 5 | 5 |

Example 2

Physical Properties

Each dispersion obtained in example 1 was applied, in the film form, to a polypropylene plaque (800 μm wet) before drying it at 23° C. under 50% relative humidity for 7 days.

The following tests were then carried out:

Dynamic mechanical analysis (DMA): Use was made of a Mettler DMA861e device in shear mode, with scanning in temperature from −50° C. to 200° C. The temperature rise gradient, was 3° C./min and the frequency was 1 Hz, Mechanical tests: Use was made of an MTS tensile testing device regulated at a temperature of 23° C., a relative humidity of 50% and a test rate of 500 mm/min, with a 50N cell and a dumbbell-shaped test specimen.

The results obtained are collated in the following table 5.

TABLE 5

| | DMA | | | Tensile testing at 500 mm/min at 23° C. | | | | |
|---|---|---|---|---|---|---|---|---|
| | | | E° (Pa) at | Breaking stress (MPa) | | Elongation at break (%) | | Young's mod. (MPa) |
| Sample | Tα (° C.) | Tanδ | 100° C. | Val. | SD | Val. | SD | Val. SD |
| D2 | 18 | 2.14 | $1.6 \times 10^4$ | 4.69 | 0.49 | 463 | 17 | 19 0.4 |
| D3 | 23 | 1.84 | $2.3 \times 10^4$ | 6.61 | 0.19 | 409 | 17 | 35 0.8 |
| D4 | 20 | 1.93 | $1.5 \times 10^4$ | 5.04 | 0.20 | 480 | 14 | 18 0.3 |

It emerges from this table that the differences between the dispersions tested are extremely small, so that the mechanical and viscoelastic properties of the films are regarded as equivalent. The use of larger amounts of 2OctA does not modify them.

Example 3

Applicative Evaluation a. Formulation of the Varnishes

Varnishes were formulated by using the starting materials identified in table 6 below.

TABLE 6

| Constituent | Role | Chemical nature | Supplier |
|---|---|---|---|
| Aquaflow NHS 300 | Thickening agent | Hydrophobically modified polyacetal-polyether (HMPAPE) | Ashland |
| Aquaflow NMS 450 | Thickening agent | Hydrophobically modified polyacetal-polyether (HMPAPE) | Ashland |
| Foamstar A38 | Antifoaming agent | Polymer | Cognis BASF |

The dispersions prepared in example 1 were formulated in the form of varnishes (solids content by volume at 35%) having the following compositions:

Varnish V1:

| Constituent | Weight (g) | Volume (ml) |
|---|---|---|
| Dispersion D2 | 145.13 | 136.92 |
| Aquaflow NHS 300 | 8.76 | 8.42 |
| Aquaflow NMS 450 | 4.98 | 4.83 |
| Water | 41.04 | 41.04 |
| Foamstar A38 | 0.10 | 0.10 |
| Total | 200.00 | 191.31 |

Varnish V2:

| Constituent | Weight (g) | Volume (ml) |
|---|---|---|
| Dispersion D3 | 132.10 | 124.62 |
| Aquaflow NHS 300 | 8.70 | 8.37 |
| Aquaflow NMS 450 | 4.94 | 4.8 |
| Water | 54.16 | 54.16 |
| Foamstar A38 | 0.10 | 0.10 |
| Total | 200.00 | 192.05 |

Varnish V3:

| Constituent | Weight (g) | Volume (ml) |
|---|---|---|
| Dispersion D4 | 132.62 | 125.11 |
| Aquaflow NHS 300 | 8.70 | 8.37 |
| Aquaflow NMS 450 | 4.95 | 4.80 |
| Water | 53.63 | 53.63 |
| Foamstar A38 | 0.10 | 0.10 |
| Total | 200 | 192.02 | b. Evaluation of the Resistance to Water

The above varnishes V1 to V3 were applied to a glass plate (200 μm wet) and dried at 23° C., 50% RH, for 7 days.

At the end of the 7 days, a drop of water was deposited on the surface of the varnish film and left in contact with the latter for 15 minutes, 30 minutes, 1 hour, 2 hours, 8 hours and then 24 hours. The bleaching of the film on contact with water was then evaluated according to the following scale of grading: 0=no bleaching, 1=slight bleaching, 2=moderate bleaching, 3=intense bleaching.

| | | Varnish: | | |
|---|---|---|---|---|
| | Contact time | V1 | V2 | V3 |
| Resistance to water | 15 minutes | 0 | 0 | 0 |
| | 30 minutes | 1 | 0 | 1 |
| | 1 hour | 1 | 0 | 1 |
| | 2 hours | 2 | 1 | 2 |
| | 8 hours | 3 | 2 | 2 |
| | 24 hours | 3 | 2 | 2 |

As is seen, the varnish V3 (formulated from the dispersion D4 which contains the biobased monomer 2OctA) exhibits a resistance to water equivalent to the varnish V1, which is formulated with the dispersion D2 not containing biobased monomer.

Example 4

Three other aqueous dispersions were prepared according to the same procedure shown in example 1.

The compositions and characteristics are collated in table 7 below:

TABLE 7

| Monomers | Dispersion D5 | Dispersion D6 | Dispersion D7 (Comp.) |
|---|---|---|---|
| MMA | 49.5 | 32.59 | 1 |
| 2OctA | 49.5 | 64.05 | 95.69 |
| AA | 1 | | 1.31 |
| HPMA | | 1.13 | |
| HEMA | | | 2 |
| Acrylamide | | 2.04 | |
| TEGDMa | | 0.18 | |
| MFFT (° C.) | +17 | 0 | 0 |
| Fox Tg (° C.) | +4 | −20 | −56 |
| Solids content, % | 48.3 | 56.0 | 56.2 |
| pH after neutralization | 8.2 | 7.4 | 8.4 |

The mechanical tests as described in example 2 were applied to these 3 dispersions, and also tensile tests at 5 mm/min carried out at −20° C.

The results are collated in table 8 below.

These tests show that the dispersions D5 and D6 exhibit a very low elongation at break at −20° C. in comparison with the dispersion D7, which has a Tg of −56° C.

TABLE 8

| | DMA | | | Breaking stress (MPa) | | Elongation at break (%) | | Young's mod. (MPa) | |
|---|---|---|---|---|---|---|---|---|---|
| Sample | Tα (° C.) | Tanδ | E° at 100° C. (Pa) | Val. | SD | Val. | SD | Val. | SD |
| | | | | Tensile testing at 500 mm/min at 23° C. | | | | | |
| D5 | 33 | 2.10 | $16.5 \times 10^4$ | 12 | 1.6 | 214 | 29 | 259 | 11 |
| D6 | 13 | 1.48 | $36.3 \times 10^4$ | 5.41 | 0.35 | 834 | 53 | 1.1 | 0.01 |
| D7 (comp.) | −27 | 2.02 | $1.26 \times 10^4$ | Impossible to determine | | | | | |
| | | | | Tensile testing at 5 mm/min at −20° C. | | | | | |
| D5 | | | | 34 | 6 | 3.5 | 0.6 | 1020 | 63 |
| D6 | | | | 22 | 0.1 | 207 | 7 | 419 | 16 |
| D7 (comp.) | | | | 2.1 | 0.09 | >1100 | — | 1.1 | 0.2 |

The invention claimed is:

1. A binding agent for aqueous coating compositions, said binding agent comprising a polymer resulting from the polymerization of 2-octyl acrylate of renewable origin and optionally at least one other monomer, wherein the polymer has a glass transition temperature (Tg), calculated by Fox's law, of between −40° C. and +40° C., and is in aqueous dispersion form.

2. The binding agent of claim 1 wherein said other monomer is selected from the group consisting of: vinylaromatic monomers; ethylenically unsaturated nitriles; esters of ethylenically unsaturated mono- and dicarboxylic acids; esters of monocarboxylic acid and vinyl and allyl alcohol; ethylenically unsaturated mono- and dicarboxylic and sulfonic acids; amides of ethylenically unsaturated mono- and dicarboxylic acids; N-vinyllactams; N-vinylamides; N,N-diallylamines; N,N-diallyl-N-alkylamines; allyl- and vinyl-substituted nitrogenous heterocycles; and their mixtures.

3. The binding agent of claim 2 wherein said other monomer is selected from the group consisting of esters of ethylenically unsaturated mono- and dicarboxylic acids, vinylaromatic monomers, and their mixtures.

4. The binding agent of claim 1 wherein the polymer has a glass transition temperature (Tg), calculated by Fox's law, ranging from −30° C. to +30° C.

5. The binding agent of claim 1 wherein the polymer is a copolymer including from 30% to 75% by weight 2-octyl acrylate, with respect to the total weight of the copolymer.

6. The binding agent of claim 1 wherein the polymer represents, by dry weight, from 5% to 50% by weight, with respect to the total weight of the composition.

7. A paint, mortar, coating, varnish or ink composition comprising the binding agent of claim 1.

* * * * *